2,881,146

ORGANOPOLYSILOXANE EMULSION CONTAINING POLYMERIZATION CATALYST AND COLLOIDAL SILICA

Norman A. Remer, Pasadena, Tex., and Ralph Aarons, Wilmington, Del., assignors to E. I. du Pont de Nemours and Company, Wilmington, Del., a corporation of Delaware No Drawing. Application July 10, 1956
Serial No. 596,853

5 Claims. (Cl. 260—29.2)

This invention relates to the treatment of surfaces to lend both water repellence and soil resistance by a single treatment. The invention is further directed to compositions which comprise organopolysiloxane emulsions which contain a polymerization catalyst and colloidal silica, and to the preparation of such compositions.

This application is a continuation-in-part of our copending application Serial No. 519,638, filed July 1, 1955, now abandoned.

It has heretofore been proposed to make surfaces water repellent by treatment with organopolysiloxanes. Various specific compositions and emulsions have been developed which can be used for the treatment of fabrics and for the treatment of other surfaces.

We have found that organopolysiloxane emulsions which contain a polymerization catalyst and colloidal silica impart outstanding soil resistance to treated surfaces without diminishing to any substantial extent the water repellent property of the organopolysiloxane.

The preferred compositions of the present invention also contain a nonionic wetting agent. It has been found that materials such as fabrics treated with these preferred compositions containing a nonionic wetting agent have superior hand and soil resistance.

In the practice of the present invention there can be used such emulsions of organopolysiloxanes as those shown in Dennett U.S. Patents 2,588,365 and 2,588,366.

Briefly the organopolysiloxanes employed have a repeating structure:

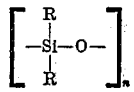

where R, as shown in the patents, can be hydrogen or a monovalent organic group such as hydrocarbons like phenyl, benzyl, and alkyl of up to 14 carbon atoms. By far the most preferred compounds are those in which the R substituents are lower alkyl substituents, such as methyl and ethyl, and in which there are about one-half to two alkyl radicals per silicon atom, the remainder being hydrogen.

$n$ is a whole number from two and extending upwardly above, say, ten to a thousand or even more.

The emulsions of polysiloxanes often advantageously contain emulsifying agents. Thus there can be used quaternary ammonium halides such as alkyl aryl ammonium chlorides like trimethylbenzyl ammonium chloride and hexadecyldimethylbenzyl ammonium chloride. Other emulsifying agents shown in the patents above cited and known in the art can, of course, be used.

Further examples will be given hereinafter of specific organopolysiloxane compositions illustrative of the invention, but the disclosure of the various patents above recited is incorporated herewith by reference.

The catalysts are necessary in the polysiloxane emulsions to promote sufficient polymerization. Thus there can be used organic peroxides such as benzoylperoxide, tertiary butyl paraperbenzoate, and the like referred to in the patents previously noted. Also such materials as metal salts of fatty acids, such as stannic oleate, zinc octoate and zirconium acetate; and N-mono or di substituted alkyl amides can be used as polymerization catalysts. It is further to be observed that the point of addition of the catalyst is not critical; it can be varied without substantial effect.

The silica incorporated in polysiloxane emulsions, according to the invention, is preferably in the form of discrete, spherical particles having an average diameter in the range of about 3 to 20 millimicrons. Somewhat larger particles can be employed, but the soil resistance obtained is not quite as great.

Suitable silica sols are shown in the Bird Patent 2,244,325 wherein a silica sol is prepared by passing sodium silicate through a cation-exchanger. Sols thus prepared have a comparatively small particle size.

Also suitable are sols prepared as in the Bechtold and Snyder Patent 2,574,902. Such sols are composed of discrete particles which have diameters ranging upwardly to 100 or 150 millimicrons.

Also suitable are sols prepared as in the Rule Patent 2,577,485. The sols as thus prepared are composed of dense, discrete, spherical particles of from about 10 to 130 millimicrons.

The sols can have a $SiO_2$:$Na_2O$ weight ratio from about 60:1 to 500:1, the ratio in each case depending upon the particular sol.

A further detailed description of such sols appears unnecessary as they are fully described in the patents mentioned and in the literature.

It will be understood that other anti-soiling agents of somewhat similar character can be substituted for silica as equivalent in the compositions of the invention. Thus instead of using silica sols, there can be used sols of colloidal alumina, colloidal aluminum phosphates, and the like.

In preparing compositions of the invention the polysiloxane emulsion is prepared in accordance with practices already common in the art. Such emulsions normally have a pH from about pH 3 to pH 9, although usually the pH is less than 7. The emulsions also are normally rather concentrated containing, say, 25–50% or even more of the polysiloxane solids by weight.

The emulsions can be used in the concentrated form, or they can be diluted to a concentration of about 0.5 to 10% of the silicone by weight prior to the addition of the silica sol.

The preferred method of preparing these compositions is to use the polysiloxane emulsion in the concentrated form and add to the emulsion a diluted silica sol. Ordinarily the colloidal silica sol as prepared will be relatively concentrated, containing from about 15 to 30% by weight or even greater amounts of silica. In the preferred practice, the silica sol is extended with water to about 5% $SiO_2$ by weight concentration, which is then added to the concentrated polysiloxane emulsion.

Alternatively, these compositions can be prepared by using a concentrated silica sol, that is one containing about 15 to 30% by weight of $SiO_2$, and adding to this a polysiloxane emulsion that has been diluted with water to a concentration of about 0.5 to 10% by weight of the organopolysiloxane.

Another alternative is to dilute both the silica sol and the organopolysiloxane emulsion prior to mixing of the two together. When this is done, it is usually desirable to adjust the pH of the polysiloxane emulsion and the silica sol to about pH 7 to pH 9.

While the polymerization catalyst can be added at any desired time during the preparation of these compositions, perhaps the best practice is to add the catalyst rapidly immediately after mixing the silica sol and polysiloxane emulsion.

The final surface-treating composition that is adapted to lend both water and soil-resistance will contain from about 0.5 to 10% by weight of the polysiloxane solids, about 0.5 to 5% $SiO_2$ by weight, and about 0.1–5.0% by weight of the polymerization catalyst.

As aforementioned, the preferred compositions contain in addition to the polysiloxane, silica and polymerization catalyst, a nonionic wetting agent. The time of addition of the wetting agent to the composition is not critical, although perhaps the most convenient procedure is to add it after the other ingredients have been mixed together. Suitable nonionic wetting agents for use in these compositions are soluble condensation products of an alkylene oxide with fatty acids, amides and fatty acid esters of polyhydric alcohols, for example, polyoxyethylene sorbitan monolaurate sold by the proprietary name "Tween" 20; polyethylene ester of long chain fatty acids, "Renex" 20; trimethylnonyl ether of polyethylene glycol, "Tergitol TMN"; polyethylene glycol tert. dodecyl thioether, "Nonic" 218; and polyoxyethylene substituted fatty acid amines (hydrogenated tallow amide), "Ethonid HT 25." Other suitable nonionic wetting agents that can be used in these compositions are set forth by McCutcheon in Soap and Chemical Specialties, July-October, 1955, entitled "Synthetic Detergents and Emulsifiers."

Ordinarily the nonionic wetting agent is included in an amount up to 25% of wetting agent on the basis of the silica with the most desirable amounts being about 5–15% by weight.

It is to be noted that products prepared as described are comparatively stable. Thus they can be applied in accordance with the invention without any excessive settling-out of the components. However the solutions should be used within a few hours of their preparation, if at all possible, though they will be relatively stable for several days. If it is desired to prepare emulsions of polysiloxanes which contain silica and store them for considerable lengths of time, this can be done by omitting the catalyst from the emulsion and adding it as required at the time of use.

Compositions prepared as above described can be used for treating a wide variety of surfaces. Thus they can be used for the treatment of painted surfaces which have been covered with water-base paints, alkyd resin paints, or any paint film of any character which is at least relatively insoluble in the treating composition. The compositions can be used for the treatment of paper cardboard, and especially for the treatment of fabrics of all kinds.

The compositions can be used for the treatment of textile products made of natural and synthetic fibers such as wool, cotton, nylon, acetate rayon, viscose rayon, polyacrylonitrile fibers, and any of the other fibers and blends of fibers heretofore treated with polysiloxanes or with silica sols such as those fibers shown in Dennett Patent 2,588,365. The treatment can be applied to tufted fabrics such as rugs, upholstery, and the like and to felted materials.

The treatment is similarly applicable to a wide range of surfaces including both natural and synthetic leather, rubber, including sponge and in short any surface which is not dissolved by the water contained in the treating agent.

In order that the invention may be better understood reference should be had to the following illustrative examples:

EXAMPLE 1

A composition of the invention is prepared by mixing the following:

Solution A 3.9 parts by weight of a commercial aqueous emulsion of ethyl polysiloxane containing 40% polysiloxane solids and 0.3 part by weight of hexadecyl trimethyl ammonium chloride. The siloxane contains about 0.5 ethyl groups per Si.
0.8 part by weight of sodium ethoxide.
40 parts by weight of water.

The pH is raised to 7.5 by addition of sodium hydroxide as a 5% NaOH solution.

Solution B 10 parts by weight of a 30% silica sol containing discrete, unaggregated spherical silica particles of 17 millimicrons average diameter. This is made as described in the Bechtold and Snyder Patent 2,574,902. It is sold commercially as "Ludox" colloidal silica.
45 parts by weight of water.

The pH is reduced to 7.5 using 5% hydrochloric acid.
Solution A is mixed into Solution B with vigorous stirring.

The resulting solution is stable for a period exceeding 24 hours and was used within that period to treat desized cotton duck fabric.

The fabric is soaked in the above treating solution and the excess is pressed out to produce wet pick-up of 100% based on the dry weight of the fabric. The padded fabric is cured and dried by holding for 30 minutes at 110° C. in a forced air circulation oven.

After the treatment, the cotton duck fabric contained approximately 3% $SiO_2$ and 1.5% of the polymerized polysiloxane solids. The treatment affords excellent water repellency and soil inhibition.

Instead of using a polysiloxane as shown, about equivalent results are obtained using one in which there was one ethyl group for each Si atom.

EXAMPLE 2

3 parts by weight of a trimethylsiloxy end-blocked dimethyl polysiloxane having a fluid viscosity of 23,500 centistokes, 0.3 part of cetyl trimethyl ammonium chloride, 0.02 part by weight of acetic acid and 96 parts by weight of water are emulsified using a colloid mill. The pH of the emulsion is adjusted to 7.5.

To this emulsion is added 100 parts by weight of a silica sol having a concentration of 6% $SiO_2$, the particles having an average diameter of 20 millimicrons and being discrete, the $SiO_2:Na_2O$ ratio being 285:1, and a pH being 8.5.

A sheet of bond paper is immersed in the above dispersion and the excess water expressed to give a wet pick-up of 110% based on the dry weight of the paper. The treated paper dried at 150° C. for 20 minutes shows greatly enhanced water repellency and soil inhibition.

The solution as just described was applied by brushing on paper and by spraying on rugs and upholstery with similar results.

EXAMPLE 3

3.5 parts by weight of a trimethylsiloxy end-blocked methyl phenyl polysiloxane having a fluid viscosity of 18,000 centistokes, 0.3 part by weight of hexadecyldimethyl-benzyl ammonium chloride, 0.2 part of acetic acid, and 95 parts by weight of water are emulsified, using a colloid mill. The pH of the emulsion is adjusted to 8.5.

To this emulsion is added 100 parts by weight of a silica sol having an $SiO_2$ concentration of 8% and being composed of spherical, discrete particles of an average diameter of about 10 millimicrons, an $SiO_2:Na_2O$ ratio of 100:1, and a pH of 9.

This solution was used for treating a smooth-finished wallpaper stock. The paper was dried at 130° C. The solution similarly was used for the treatment of paint, films and tennis balls.

EXAMPLE 4

Ten parts by weight of a 30% silica sol having particles with a 17 millimicron average diameter, an $SiO_2:Na_2O$ ratio of 285:1 and a pH of 8.5 is added to 85.8 parts by weight of water. To this 3.0 parts by weight of a commercial emulsion of methyl polysiloxane containing 50% polysiloxane and 1.2 parts by weight of zirconium acetate solution containing 9.6% zirconium metal are added in turn. The polysiloxane contains about 1 methyl group per Si. The pH of the resulting composition is 5.0±0.5, and it is stable for about one day.

The above composition was used to treat washed nylon-rayon upholstery fabric within three hours of preparation. The fabric was soaked in the solution, mangled to 100% wet pickup, and dried/cured in an air circulation oven for 15 minutes at 150° C. The treated fabric had excellent soil retardance and water repellence.

In the same manner as outlined above, treating compositions were made up containing varying ratios of the same colloidal silica and polysiloxane. The following table summarizes the quantities of the materials used in parts by weight; the treatments on the same tested nylon-rayon upholstery fabric rendered the substrate water repellent and soil retardant:

| Water | 30% $SiO_2$ Sol | Methyl Polysiloxane emulsion, 50% polysiloxane | Zirconium acetate solution (9.6% Zr) | Ratio of silica to polysiloxane | pH ±0.5 |
|---|---|---|---|---|---|
| 82.4 | 13.4 | 3.0 | 1.2 | 3 | 5 |
| 89.0 | 6.7 | 3.0 | 1.2 | 1.33 | 5 |
| 92.4 | 3.4 | 3.0 | 1.2 | 0.67 | 5 |

Substantially the same results were obtained by substituting for the above polysiloxane, one in which there was ½ methyl groups for each Si atom.

EXAMPLE 5

To 87.9 parts by weight of water were added 10.5 parts by weight of colloidal silica of 17 millimicron average particle size (30% aqueous sol, sold under the proprietary name "Ludox"), $SiO_2:Na_2O$ ratio of 285:1 and a pH fo 8.5. To this, 4.4 parts by weight of dimethyl polysiloxane (2 methyl groups per Si atom) were added from a commercial emulsion containing 30% silicone, followed by the addition of 2.2 parts by weight of stannous oleate emulsion containing 2% tin. The pH of the resulting composition was 7.4, and was stable for over one week.

With the above composition a wide variety of fabrics were treated, including nylon-rayon upholstery, cotton duck and "Dacron" polyester fiber suiting, by padding, followed by mangling to 100% retention on the dry fabric basis, and dried/cured in an air circulation oven for 25 minutes at 140° C. The treated fabrics had excellent soil resistance and water repellence.

Using the above materials, compositions of various concentrations were prepared, and samples of the same materials were treated and all had good soil retardance and water resistance. The following table summarizes the quantities of materials used in these treatments, in parts by weight.

| Water | "Ludox" | Silicone emulsion 30% polysiloxane | Stannous oleate catalyst emulsion | Ratio of Silica to polysiloxane | pH ±0.5 |
|---|---|---|---|---|---|
| 40.8 | 3.0 | .75 | .38 | 4.0 | 8 |
| 34.1 | 7.5 | 2.25 | 1.12 | 3.33 | 8 |
| 76.5 | 9.0 | 3.0 | 1.5 | 3.0 | 7 |
| 39.8 | 3.0 | 1.5 | .75 | 2.0 | 7 |
| 36.0 | 4.5 | 3.0 | 1.5 | 1.5 | 7 |
| 41.3 | 1.5 | 1.5 | .75 | 1.0 | 7 |

EXAMPLE 6

To 37.2 parts by weight of water 2.3 parts by weight of a commercial emulsion of dimethyl polysiloxane (2 methyl groups per Si atom), containing 30% silicone, was added. To this 4.5 parts by weight of colloidal silica, containing 30% $SiO_2$ of particles with an average diameter of 17 millimicrons and an $SiO_2:Na_2O$ ratio of 285:1 and a pH of 8.5 was added. Then 1.1 parts by weight of zinc octoate emulsion, containing 2% zinc was added. The resulting mixture had a silica:siloxane ratio of 2 and a pH of 7.3±0.5.

With this composition samples of cotton rug were treated by padding to 150% wet pickup, and were dried/cured at 150° C. for 60 minutes. These samples possessed a high degree of water repellence and good soil retardance.

EXAMPLE 7

To 74.3 parts by weight of water 9.0 parts by weight of colloidal silica, having an average particle size of 17 millimicrons, an $SiO_2:Na_2O$ ratio of 285:1, and a pH of 8.5, containing 30% $SiO_2$, was added. To this 4.5 parts by weight of a commercial dimethyl polysiloxane emulsion, containing 30% silicone and having about 2 methyl groups per Si atom, and 2.25 parts by weight of stannous oleate emulsion, containing 2% tin, were added in that order. The composition thusly prepared was stable for more than two days, had a silica to siloxane ratio of 2, and a pH of 7.3±0.5.

Samples of nylon-rayon upholstery were treated by padding from the composition; after wringing to 100% wet pickup they were dried/cured at 130° C. for 25 minutes. The samples had good soil retardance and excellent water repellence.

EXAMPLE 8

A composition was prepared in the same manner as described in Example 7, by adding 9.0 parts by weight of colloidal silica (average particle size of 17 millimicrons, an $SiO_2:Na_2O$ ratio 285:1, pH of 8.5, and containing 30% $SiO_2$) to 74.0 parts by weight of water. At this point 0.22 part by weight of polyoxyethylene sorbitan monolaurate (commercial name "Tween 20") was added so that the ratio of $SiO_2$ to surfactant was about 12.5:1. To this, 4.5 parts by weight of commercial dimethyl polysiloxane emulsion (2 methyl groups per Si atom) containing 30% silicone, and 2.25 parts by weight of stannous oleate emulsion, containing 2% tin, were added respectively. The resulting solution was stable for more than two days, and had a pH of 7.4±0.5.

With this composition samples of nylon-rayon upholstery fabrics were treated by padding to 100% wet pickup, followed by drying/curing at 130° C. for 25 minutes in an air circulation oven. The treated samples had excellent soil retardance, even better than the samples in Example 7, and had good water repellence.

Similar results are obtained using compositions prepared in accordance with this procedure but containing in place of the "Tween 20" equal amounts of "Renex 20" (polyethylene ester of long chain fatty acids), "Tergitol TMN" (trimethylnonyl ether of polyethylene glycol), "Nonic 218" (polyethylene glycol tert. dodecyl thioether) or "Ethonid HT 25" (polyoxyethylene substituted fatty acid amines).

EXAMPLE 9

To 75.5 parts by weight of water 17 parts by weight of colloidal silica of 7 millimicrons average diameter particle size (containing 17.5% $SiO_2$, having an $SiO_2$ to $Na_2O$ ratio of 75, and a pH of 9.8) was added. To this 5 parts by weight of trimethyl siloxy end-blocked methyl polysiloxane (1.5 methyl groups per Si atom) emulsified in water containing 30% silicone solids, and 2.5 parts by weight of tin oleate emulsion as a catalyst (containing 2% tin) were added in the same order. The resulting composition had a pH of about 8 and was stable for several days.

With this composition a fur felt hat and an acoustical tile were treated by padding and by spraying respectively. They were dried/cured at 130° C. for 25 minutes in an air circulation oven. The treated substrates had excellent soil retardance and good water repellence.

We claim:
1. A composition for applying to hydrophilic, soilable surfaces to impart both water repellence and resistance to soiling thereto, the composition comprising (a) an aqueous emulsion having a pH of 3 to 9 and a dispersed phase consisting of an organopolysiloxane having a repeating structure of the formula

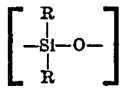

where R is selected from the group consisting of hydrogen, phenyl, benzyl, and alkyl groups of up to 14 carbon atoms, (b) a catalyst for promoting polymerization of the organopolysiloxane, said catalyst being selected from the group consisting of organic peroxides, metal salts of fatty acids, and N-mono- and di-substituted alkyl amides, and, (c) colloidally dispersed in the composition, dense, discrete amorphous silica particles averaging 3 to 150 millimicrons in diameter, the composition containing from about 0.5 to 10 percent by weight of the polysiloxane solids, about 0.5 to 5 percent by weight of the amorphous silica, and about 0.1 to 5.0 percent by weight of the polymerization catalyst.

2. A composition of claim 1 containing a nonionic wetting agent selected from the group consisting of soluble condensation products of an alkylene oxide with fatty acids, amides and fatty acid esters of polyhydric alcohols.

3. A composition of claim 1 in which the average diameter of the colloidal silica particles is in the range from 3 to 20 millimicrons.

4. A composition of claim 3, said composition having a pH in the range from 7 to 9.

5. A composition of claim 4 containing a nonionic wetting agent selected from the group consisting of soluble condensation products of an alkylene oxide with fatty acids, amides and fatty acid esters of polyhydric alcohols.

References Cited in the file of this patent
UNITED STATES PATENTS

| | | |
|---|---|---|
| 2,460,795 | Warrick | Feb. 1, 1949 |
| 2,595,729 | Swiss | May 6, 1952 |
| 2,643,964 | Smith-Johannsen | June 30, 1953 |
| 2,666,685 | Hommel | Jan. 19, 1954 |